July 2, 1957 G. R. COONEY 2,798,208
WAVEGUIDE SWITCH
Filed Oct. 5, 1953 2 Sheets-Sheet 2

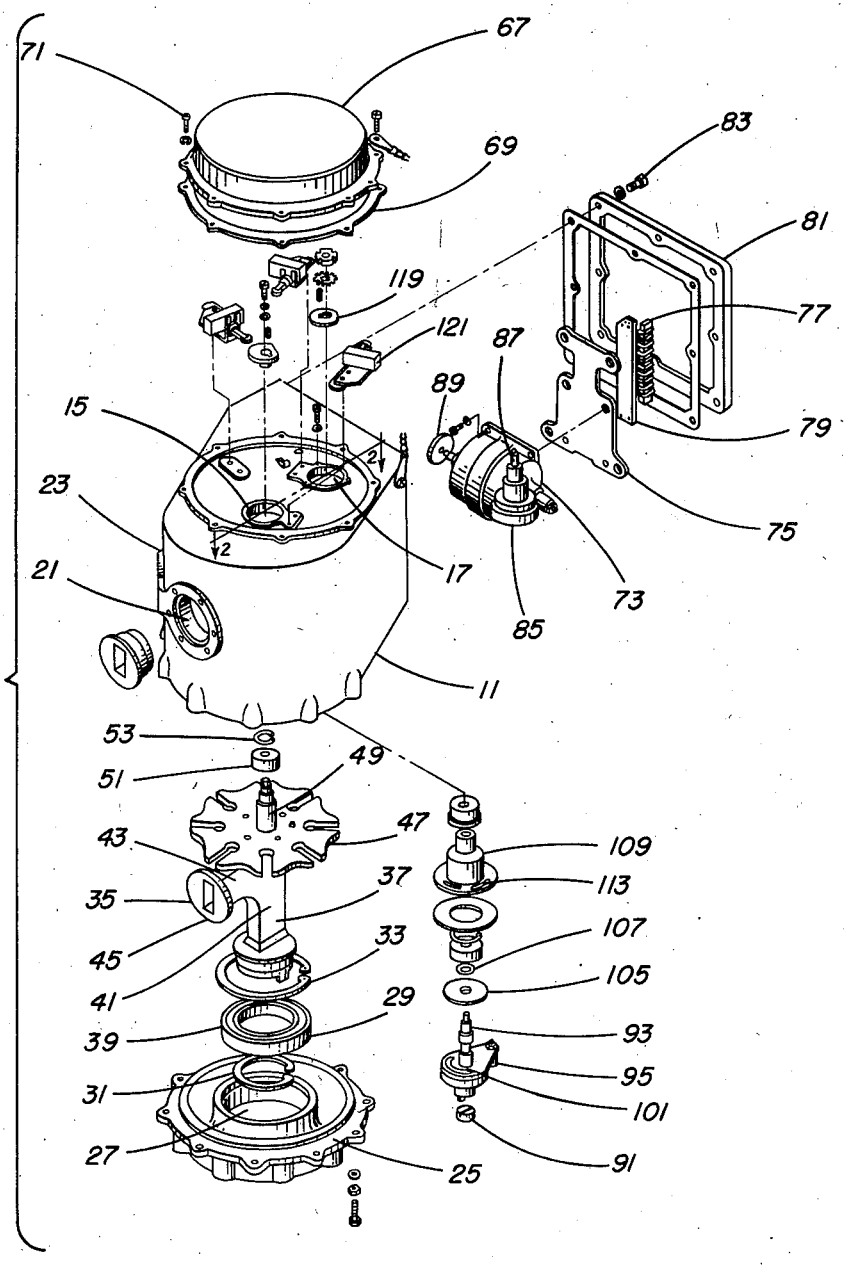

INVENTOR.
GEORGE R. COONEY
BY
ATTORNEYS

United States Patent Office 2,798,208
Patented July 2, 1957

2,798,208
WAVEGUIDE SWITCH

George R. Cooney, Lawrence, Mass., assignor, by mesne assignments, to the United States of America as represented by the Secretary of the Navy Application October 5, 1953, Serial No. 384,364

4 Claims. (Cl. 333—98)

This invention concerns a selector valve for feeding high frequency energy to a selected one of multiple outlets. In particular the present invention concerns a selector valve for use in feeding high frequency energy from a rotary joint to a selected one of two antennas such as a radar zenith antenna and a radar surface antenna.

An object of the invention is to change rapidly from one direction of energy radiation to another direction of energy radiation.

Another object is to change rapidly in a radar transmission system from one direction to another direction.

Other objects and many of the attendant advantages of this invention will be readily appreciated as the same becomes better understood by reference to the following detailed description when considered in connection with the accompanying drawings wherein:

Fig. 1 is an exploded view of a preferred embodiment of the selector valve,

Figure 2:
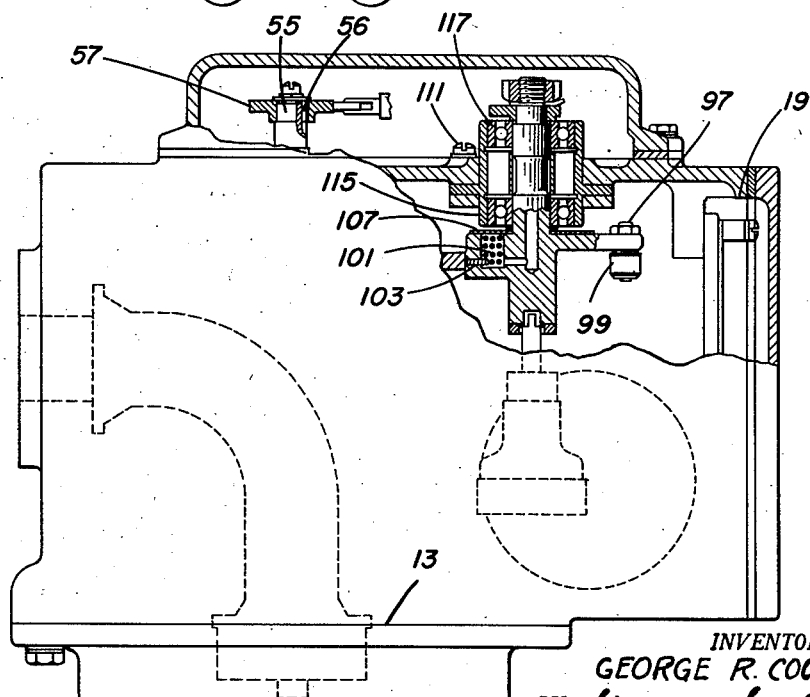
Fig. 2 is a sectional view taken substantially along 2—2 of Fig. 1.

There is shown a housing 11 that is provided at its bottom with a large opening 13 and that is provided at its top with a pair of spaced openings 15 and 17. The right side of housing 11 as seen in Figs. 1 and 2 is exposed to provide a rectangular opening 19. Opposite opening 19 is an outlet 21 that is adapted to be in communication with a zenith nozzle of a radar transmitter. Also provided in housing 11 at approximately 45 degrees angular displacement from outlet 21 is a corresponding outlet 23 that is adapted for connection to a surface nozzle of a radar transmitter. Such zenith nozzle and such surface nozzle feed respectively a zenith antenna and a surface antenna of a radar transmitter.

Opening 13 in the bottom of housing 11 is closed by a bearing retainer 25 that is provided centrally with a bearing seat 27 in which is mounted a ball bearing 29 secured in place by retaining rings 31 and 33.

Mounted for rotation in ball bearing 29 is a rotor assembly 35 having an axial arm 37 the lower extremity of which forms a depending lug 39 that is adapted for mechanical interlock with a rotary joint of the type disclosed in application Serial Number 384,363, filed October 5, 1953, by George R. Cooney, for Rotary Joint. The upper portion of axial arm 37 forms an elbow 41 that terminates in a radial arm 43 having a terminal flange 45. The upper extremity of axial arm 37 is fixedly connected with a Geneva wheel 47 which in turn is fixedly connected to a shaft 49 that extends upwardly therefrom in axial alignment with ball bearing 29 and axial arm 37. Shaft 49 is supported in a ball bearing 51 disposed in opening 15 of housing 11. Ball bearing 51 is maintained in position by retaining ring 53. Shaft 49 extends upwardly through ball bearing 51 and externally of housing 11 to a terminal portion 55 to which is fixed by a key 56 a cam 57. Mounted on the top of housing 11 adjacent opening 15 are a pair of snap-action switches 59 and 61 that are provided respectively with rollers 63 and 65 that are actuated by cam 57.

Cam 57 together with snap-action switches 59 and 61 are enclosed by a cover 67 that seats by means of a gasket 69 against the top of housing 11 and is secured in place by screws 71.

Snap action switches 59 and 61 are part of a control system for controlling rotation of rotor assembly 35 to feed the high frequency energy of the radar transmitter to either the zenith or the surface antenna. A control system of this type is disclosed in application Serial Number 347,904, filed April 10, 1953, by J. F. McLaughlin, for Antenna Feed Selector System.

In operation rotor assembly 35 turns on the axis defined by ball bearing 29 and ball bearing 51 through an arc of approximately 45 degrees between a first working position with radial arm 43 in registration with opening 21 and a second working position with radial arm 43 in registration with opening 23 whereby high frequency energy is fed in the first working position from its source to a zenith antenna and in the second working position is fed from its source to a surface antenna.

Mounted inside housing 11 adjacent opening 19 is a drive motor 73 secured upon a mounting plate 75 that is fastened to housing 11. Mounted on the side of mounting plate 75 outwardly from housing 11 is a terminal strip 77 and associated identification plate 79. Mounting plate 75 together with terminal strip 77 and identification plate 79 are covered by a door 81 secured to housing 11 by screws 83.

Drive motor 73 is provided with a power takeoff 85 having an upwardly extending drive shaft 87. Drive motor 73 at the end opposite power takeoff 85 is provided with a knurled handle 89 for manual operation. Disposed above drive shaft 87 is a coupling 91 connected with the lower end of a Geneva drive shaft 93. Mounted fixedly on Geneva drive shaft 93 is a Geneva cam 95 at the radially outward extremity of which is a stud 97 and roller 99. Geneva roller 99 is adapted for engagement with Geneva wheel 47 to effect rotation of rotor assembly 35 about its axis. As seen in Fig. 2 the portion of Geneva cam 95 diametrically opposite to roller 99 is provided with lubricating means in the form of loose packing 101 disposed about the top of Geneva cam 95 and in fluid communication with a wick 103 extending radially from Geneva cam 95 and in wiping engagement with the periphery of Geneva wheel 47. Loose packing 101 is protected by an oiler cover 105 fitted against the top of Geneva cam 95 and maintained in position by spacer 107.

Mounted in opening 17 in the top of housing 11 is an eccentric cartridge 109 that can be angularly adjusted to vary the position of the axis of Geneva drive shaft 93 and locked in selected position by screws 111 that extend through elongated arcuate slots 113 in eccentric cartridge 109. A pair of axially spaced bearings 115 and 117 are disposed between eccentric cartridge 109 and the upper end of Geneva drive shaft 93. Keyed to the upper extremity of Geneva drive shaft 93 is a cam 119. Mounted on the top of housing 11 inside cover 67 and adjacent opening 17 is a snap action switch 121 provided with a roller 123 adapted for actuation by cam 119. When it is desired to cause rotation of rotor assembly 35 about its axis, drive motor 73 is energized to cause rotation of drive shaft 87 and Geneva drive shaft 93. This in turn causes Geneva cam 95 to effect rotary movement of Geneva wheel 47 and thus cause rotation of rotor assembly 35 about its axis into desired position.

Figure 3:
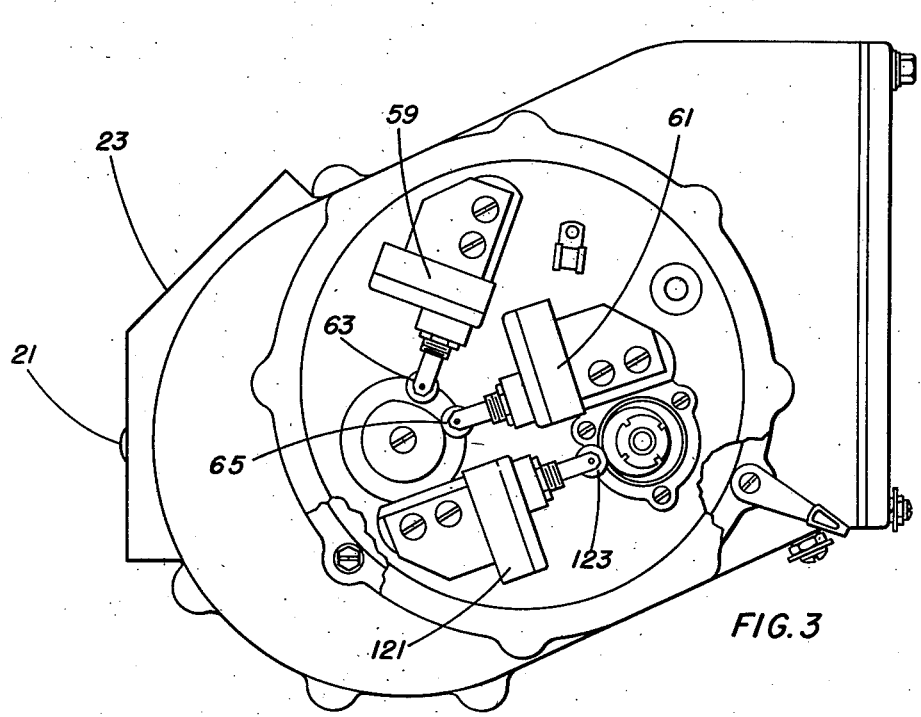
Fig. 3 is a plan view from the top of Fig. 2 with the cover removed.

In operation assuming that the selector valve is in the first working position shown in Fig. 2 with radial arm 53 in registration with outlet 21 to a zenith nozzle for feeding high frequency energy to a zenith antenna, and further supposing it is desired to actuate the selector valve so that high frequency energy is fed to a surface antenna, drive motor 73 is energized to cause rotation of drive shaft 87 which in turn effects rotation of Geneva drive shaft 93 and Geneva cam 95. This operation causes Geneva roller 99 to mesh with Geneva wheel 47 to cause clockwise rotation of the Geneva wheel as seen in Figs. 1 and 3. Because Geneva wheel 47 is fixedly mounted relative to rotor assembly 35, rotation of Geneva wheel 47 causes rotation of rotor assembly 35 until radial arm 43 is in registration with the outlet 23 in housing 11 to feed high frequency energy to a surface antenna. Rotor assembly 35 is arrested in registration with opening 23 and is prevented from riding past opening 23 in its clockwise movement by contact of cams 57 and 119 with rollers 63, 65 and 123 of snap-switches 59, 61 and 121 as components of the electrical control system.

The selector valve is connected to deliver high frequency energy from a source through a rotary joint of the type shown in patent application Serial Number 384,363, filed October 5, 1953, by George R. Cooney, for Rotary Joint. The selector valve serves to feed the high frequency energy to a selected one of a zenith antenna and a surface antenna. Electrical control of operation of the selector valve assembly is by means of a system of the type shown in patent application, Serial Number 347,904, filed April 10, 1951, by J. F. McLaughlin, for Antenna Feed Selector System.

Obviously many modifications and variations of the present invention are possible in the light of the above teachings. It is therefore to be understood that within the scope of the appended claims the invention may be practiced otherwise than as specifically described.

I claim:

1. A waveguide selector valve, said selector valve comprising support means formed with first and second waveguide outlet means, a rotor assembly mounted on said support means, said rotor assembly including an elbow having an axial waveguide arm and a radial waveguide arm in communication therewith, said rotor assembly also including a Geneva wheel secured to said elbow in axial alignment with said axial waveguide arm for rotation with said elbow, said rotor assembly being rotatable into a first working position with said radial arm in precise registration with said first waveguide outlet means and into a second working position with said radial arm in precise registration with said second waveguide outlet means, a drive motor mounted in said support means, and a Geneva cam connected to and actuated by said drive motor, said Geneva cam being in meshing engagement with said Geneva wheel for rotating said radial arm of said rotor assembly from precise registration with said first waveguide outlet means to precise registration with said second waveguide outlet means and vice versa.

2. A waveguide selector valve, said selector valve comprising support means, first and second waveguide outlet means, a rotor assembly on said support means, said rotor assembly including an elbow having an axial waveguide arm and a radial waveguide arm in communication therewith, said rotor assembly also comprising a Geneva wheel secured to said elbow in axial alignment with said axial waveguide arm, said rotor assembly being rotatable precisely into a first working position with said radial arm in registration with said first waveguide outlet means and precisely into a second working position in registration with said second waveguide outlet means, a drive motor, a drive shaft connected to said motor parallel to said axial waveguide arm, a Geneva cam secured on said drive shaft and in meshing engagement with said Geneva wheel, an eccentric cartridge on said support means, bearing means in said cartridge for rotatably supporting said drive shaft, means permitting adjustment of said cartridge on said support means to regulate the position of said drive shaft and the position of said Geneva cam relative to said Geneva wheel to ensure precise positioning of said waveguide radial arm, and control means actuated by said rotor assembly for controlling actuation of said drive means.

3. A selector valve for a radar system, said selector valve being adapted for feeding high frequency energy to a selected one of a zenith antenna and a surface antenna said energy having passed from a source through a rotary joint assembly, said selector valve comprising a housing, bearing means in said housing defining an axis, said housing having a first outlet and a second outlet, said outlets being angularly spaced about 45 degrees apart in a plane transverse to said axis, a rotor assembly supported in said bearing means for rotation about said axis, said rotor assembly comprising a waveguide elbow having an axial arm and a radial arm in communication therewith, said rotor assembly also comprising a Geneva wheel and a first cam secured to said elbow in axial alignment with said axial arm, said rotor assembly being rotatable precisely into a first working position with said radial arm in registration with said first outlet and said rotor assembly being rotatable through an angle of about 45 degrees precisely into a second working position with said radial arm in registration with said second outlet, first electrical switch means secured to said housing adjacent said first cam for actuation by said first cam, a drive motor mounted in said housing, a drive shaft connected to said motor parallel to said axial arm, a Geneva cam secured on said drive shaft and in meshing engagement with said Geneva wheel, rotation of said drive motor causing actuation of said Geneva cam and Geneva wheel to rotate said rotor assembly, an oil reservoir formed in said Geneva cam, a wick in said Geneva cam for feeding oil from its reservoir to the surface of said Geneva cam meshing with said Geneva wheel, an eccentric cartridge mounted on said housing, bearing means in said cartridge for rotatably supporting said drive shaft, means permitting adjustment of said cartridge on said housing to regulate the position of said drive shaft and the position of said Geneva cam relative to said Geneva wheel to ensure precise positioning of said radial arm, a second cam secured to said drive shaft, and second electrical switch means mounted on said housing adjacent said second cam for actuation by said second cam, said first and second electrical switch means being adapted to control energization of said drive motor.

4. A waveguide selector valve, said selector valve comprising support means, first and second waveguide outlet means, a rotor assembly on said support means, said rotor assembly including an elbow having an axial waveguide arm and a radial waveguide arm in communication therewith, said rotor assembly also comprising a Geneva wheel secured to said elbow in axial alignment with said axial waveguide arm, said rotor assembly being rotatable precisely into a first working position with said radial arm in registration with said first waveguide outlet means and precisely into a second working position in registration with said second waveguide outlet means, a drive motor, a drive shaft connected to said motor parallel to said axial waveguide arm, a Geneva cam secured on said drive shaft and in meshing engagement with said Geneva wheel, an eccentric cartridge on said support means, bearing means in said cartridge for rotatably supporting said drive shaft, and means permitting adjustment of said cartridge on said support means to regulate the position of said drive shaft and the position of said Geneva cam relative to said Geneva wheel to ensure precise positioning of said waveguide radial arm.

References Cited in the file of this patent

UNITED STATES PATENTS

| | | |
|---|---|---|
| 2,480,189 | Irving | Aug. 30, 1949 |
| 2,480,589 | McKenney | Aug. 30, 1949 |
| 2,602,895 | Hansen | July 8, 1952 |
| 2,759,153 | Charles | Aug. 14, 1956 |

OTHER REFERENCES

Article by Long, Proc. I. R. E., December 1951, pages 1566–1567.